(12) United States Patent
Zhao et al.

(10) Patent No.: US 11,354,474 B2
(45) Date of Patent: Jun. 7, 2022

(54) METHOD, APPARATUS AND COMPUTER STORAGE MEDIUM FOR AUTHENTICATING CHIP

(71) Applicants: Beijing Baidu Netcom Science and Technology Co., Ltd., Beijing (CN); Kunlunxin Technology (Beijing) Company Limited, Beijing (CN)

(72) Inventors: Baofu Zhao, Beijing (CN); Xueliang Du, Beijing (CN); Jiaqiang Liu, Beijing (CN); Ziteng Huang, Beijing (CN)

(73) Assignees: Beijing Baidu Netcom Science and Technology Co., Ltd., Beijing (CN); Kunlunxin Technology (Beijing) Company Limited, Beijing (CN)

( * ) Notice: Subject to any disclaimer, the term of this patent is extended or adjusted under 35 U.S.C. 154(b) by 0 days.

(21) Appl. No.: 17/213,759

(22) Filed: Mar. 26, 2021

(65) Prior Publication Data
US 2021/0216693 A1 Jul. 15, 2021

(30) Foreign Application Priority Data

Aug. 31, 2020 (CN) .......................... 202010899094.6
Sep. 3, 2020 (CN) .......................... 202010915536.1

(51) Int. Cl.
*G06F 30/3308* (2020.01)
*G06F 9/30* (2018.01)

(52) U.S. Cl.
CPC ...... *G06F 30/3308* (2020.01); *G06F 9/30098* (2013.01)

(58) Field of Classification Search
CPC .. G06F 30/3308; G06F 9/30098; G06F 30/27; G06F 30/331; G06F 2221/034;
(Continued)

(56) References Cited

U.S. PATENT DOCUMENTS 6,026,230 A * 2/2000 Lin .......................... G06F 30/33
703/13
6,052,524 A * 4/2000 Pauna ....................... G06F 30/33
703/22

(Continued)

OTHER PUBLICATIONS

Bombieri et al., "RTL-TLM Equivalence Checking Based on Simulation", Design & Test Symposium, 2008, pp. 1-4.
(Continued)

*Primary Examiner* — Stacy Whitmore
(74) *Attorney, Agent, or Firm* — The Webb Law Firm

(57) ABSTRACT

A method and an apparatus for authenticating a chip are provided and a computer storage medium is also provided. The method may include configuring a software environment and a hardware environment associated with the chip via a configuration file, the configuration file including a plurality of instructions and data required to execute the instructions, the software environment and the hardware environment being created based on the chip; causing a plurality of instructions to be executed in a software environment and a hardware environment, respectively; obtaining a first information generated by executing instructions in a software environment and a second information generated by executing instructions in the hardware environment, respectively, the first information and the second information including the plurality of instructions being executed, its address, and data generated by executing the instructions; and authenticating the chip based on the generated first information and second information.

18 Claims, 7 Drawing Sheets

(58) Field of Classification Search
CPC ............... G06F 21/44; G06F 30/3312; G01R 31/318364; G01R 31/31704; G01R 31/318314; G01R 31/318357
See application file for complete search history.

(56) References Cited

U.S. PATENT DOCUMENTS

| | | | | |
|---|---|---|---|---|
| 6,272,451 B1* | 8/2001 | Mason | .................... | G06F 30/34 |
| | | | | 703/13 |
| 6,389,379 B1* | 5/2002 | Lin | ...................... | G06F 30/331 |
| | | | | 703/14 |
| 6,848,084 B1* | 1/2005 | Pandey | .................. | G06F 30/33 |
| | | | | 716/107 |
| 7,302,380 B2* | 11/2007 | Shibata | ................... | G06F 30/33 |
| | | | | 703/22 |
| 7,496,820 B1* | 2/2009 | Theron | ............ | G01R 31/31813 |
| | | | | 703/15 |
| 7,533,246 B2* | 5/2009 | Taylor | .................... | G06F 8/447 |
| | | | | 712/200 |
| 9,582,274 B1* | 2/2017 | Gschwind | ........... | G06F 9/30098 |
| 9,600,384 B2* | 3/2017 | Hasan | .................... | G06F 11/22 |
| 10,228,992 B2* | 3/2019 | Gschwind | .............. | G06F 12/00 |
| 10,452,393 B2* | 10/2019 | Chou | .................... | G06F 30/39 |
| 10,740,452 B2* | 8/2020 | Hosie | .................... | G06F 21/42 |
| 10,769,329 B1* | 9/2020 | Chilwal | ................ | G06F 30/327 |
| 10,997,343 B1* | 5/2021 | Poplack | ................ | G06F 30/333 |
| 11,036,906 B1* | 6/2021 | Chhabra | ............ | G06F 30/3308 |
| 11,080,444 B1* | 8/2021 | Kumar | ................ | G06F 30/3308 |
| 2002/0052729 A1* | 5/2002 | Kyung | .................. | G06F 30/331 |
| | | | | 703/28 |
| 2002/0173942 A1* | 11/2002 | Rajsuman | .............. | G06F 30/331 |
| | | | | 703/14 |
| 2003/0204819 A1* | 10/2003 | Matsumoto | ............. | G06F 30/33 |
| | | | | 716/102 |
| 2004/0138845 A1* | 7/2004 | Park | ............... | G01R 31/318357 |
| | | | | 702/108 |
| 2005/0076282 A1* | 4/2005 | Thompson | ..... | G01R 31/318385 |
| | | | | 714/739 |
| 2005/0154551 A1* | 7/2005 | Pramanick | ..... | G01R 31/318307 |
| | | | | 702/119 |
| 2006/0052997 A1* | 3/2006 | Burns | ................... | G06F 11/366 |
| | | | | 703/22 |
| 2013/0185548 A1* | 7/2013 | Djabarov | ................ | G06F 21/57 |
| | | | | 713/2 |
| 2014/0278334 A1* | 9/2014 | Schaufler | ........... | G06F 11/3461 |
| | | | | 703/21 |
| 2016/0224784 A1* | 8/2016 | Krishnaswamy | ... | G06F 12/0875 |
| 2017/0083651 A1* | 3/2017 | Akkaraju | ........... | G06F 30/3323 |
| 2018/0260506 A1* | 9/2018 | Wood | ..................... | G11C 29/54 |
| 2019/0042117 A1* | 2/2019 | Brannock | ............ | G06F 3/0623 |
| 2020/0334092 A1* | 10/2020 | Ravitzki | ............. | G06F 11/2268 |
| 2021/0216328 A1* | 7/2021 | Chun | .................... | G06F 9/4401 |

OTHER PUBLICATIONS

Grosse et al., "Simulation-based Equivalence Checking between SystemC Models at Different Levels of Abstraction", Great Lakes Symposium on VLSI, 2011, p. 223-228.

Tham et al., "Functional Design Verification By Multi-Level Simulation", 21st Design Automation Conference, 1984, pp. 473-478.

* cited by examiner

METHOD, APPARATUS AND COMPUTER STORAGE MEDIUM FOR AUTHENTICATING CHIP

CROSS-REFERENCE TO RELATED APPLICATIONS

This application claims priority to Chinese Patent Application Nos. 202010915536.1 filed Sep. 3, 2020 and 202010899094.6 filed Aug. 31, 2020, the disclosures of which are hereby incorporated by reference in their entireties.

BACKGROUND OF THE INVENTION

Field of the Invention

Embodiments of the present disclosure relate to the field of chip design, and more particularly, to a method, apparatus, and computer storage medium for authenticating a chip.

Description of Related Art

In modern chip designs, such as artificial intelligence chip designs, the architecture of the chip to be constructed needs to be implemented by simulation before the actual hardware is constructed, and a simulator is needed to quickly simulate the function of the chip and authenticate whether the chip design is functionally correct. For chip designers, the architecture is implemented by simulation, which saves the overhead of hardware implementation and facilitates modification of the scheme. In view of the important role of the function simulator in chip development, a development method is desirable to ensure that the function of the function simulator is correct and complete.

SUMMARY OF THE INVENTION

According to an embodiment of the present disclosure, a scheme for authenticating a chip is provided.

In a first aspect of the present disclosure, there is provided a method of authenticating a chip, including: configuring a software environment and a hardware environment associated with a chip via a configuration file, the configuration file including a plurality of instructions and data required to execute the plurality of instructions, the software environment and the hardware environment being created based on the chip; causing the plurality of instructions to be executed in the software environment and the hardware environment respectively; obtaining a first information generated by executing the plurality of instructions in the software environment and a second information generated by executing the plurality of instructions in the hardware environment respectively, the first information and the second information including a plurality of instructions being executed, an address of the instructions, and data generated by executing the instructions; and authenticating the chip based on the generated first information and the second information.

In a second aspect of the present disclosure, there is provided an apparatus for authenticating a chip, including: a configuration module configured to configure a software environment and a hardware environment associated with a chip via a configuration file, the configuration file including a plurality of instructions and data required to execute the plurality of instructions, the software environment and the hardware environment being created based on the chip; an execution module configured to cause the plurality of instructions to be executed in the software environment and the hardware environment respectively; an information obtaining module configured to obtain a first information generated by executing the plurality of instructions in the software environment and a second information generated by executing the plurality of instructions in the hardware environment respectively, the first information and the second information including a plurality of instructions being executed, an address of the instructions, and data generated by executing the instructions; and an authentication module configured to authenticate the chip based on the generated first information and the second information.

In a third aspect of the present disclosure, there is provided an electronic device including one or more processors; and storage means for storing one or more programs, when executed by one or more processors, enable the one or more processors implement the method according to the first aspect of the present disclosure.

In a fourth aspect of the present disclosure, there is provided a computer readable storage medium having a computer program stored thereon which, when executed by a processor, implements a method according to the first aspect of the present disclosure.

It is to be understood that what is described in the Summary does not intend to limit the critical or important features of the embodiments of the disclosure, nor does intend to limit the scope of the disclosure. Other features of the present disclosure will become readily apparent from the following description.

BRIEF DESCRIPTION OF THE DRAWINGS

The above and other features, advantages and aspects of the embodiments of the present disclosure will become more apparent from the following detailed description when taken in conjunction with the accompanying drawings. In the drawings, the same or similar figures denote the same or similar elements, where.

DESCRIPTION OF THE INVENTION

Figure 1:
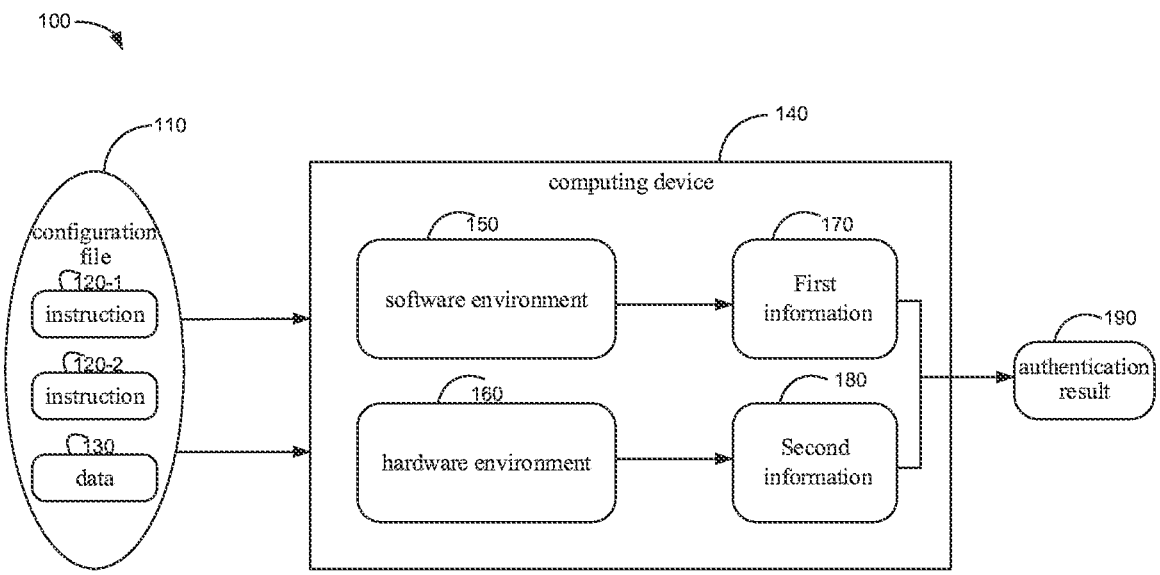
FIG. 1 illustrates a schematic diagram of an exemplary environment in which various embodiments of the present disclosure can be implemented.

Embodiments of the present disclosure will be described in more detail below with reference to the accompanying drawings. While the embodiments of the disclosure are shown in the drawings, it is to be understood that the disclosure may be implemented in various forms and should not be limited to the embodiments set forth herein. Instead, these embodiments are provided to make this disclosure complete, and will fully convey the scope of this disclosure to those skilled in the art.

The term "comprising" and variations thereof, as used herein, means open-ended, i.e., "including, but not limited to." Unless specifically stated, the term "or" means "and/or." The term "based on" means "based at least in part on." The terms "one example embodiment" and "one embodiment" means "at least one example embodiment". The term "another embodiment" means "at least one further embodiment". The terms "first," "second" or the like can refer to the same or different object; Other explicit and implicit definitions may also be included below.

As mentioned in the above, a simulator is needed to authenticate the functionality and architecture of a chip. However, the existing functional simulator development is generally performed by a software developer, and the correctness and completeness of the development are also tested by an instruction test program written by the software developer, and the test is performed only in a software environment. Therefore, it is difficult to ensure that the functions of the functional simulator are completely consistent with the target chip architecture, and cannot ensure that all the functions of the target chip architectures are realized. In addition, as the functional simulator is developed iteratively, the functional simulator becomes more complex, and it is more difficult to guarantee the completeness of the test. Accordingly, there is a need for a development method that ensures that the functionality of the functional simulator is correct and complete.

According to an embodiment of the present disclosure, a scheme for authenticating a chip is proposed. This scheme uses the configuration file to configure the software and hardware simulation environment, and then compares the results to authenticate the function of the chip. In this solution, the software environment and the hardware environment are first configured by a configuration file including instructions and data, and the software environment and the hardware environment are created based on the chip (e.g., the function and structure). The instructions are then executed in the software environment and the hardware environment. A first information generated by executing the instructions in the software environment and a second information generated by executing the instructions in the hardware environment are then obtained, respectively, where the first information and the second information include the executed instructions, the addresses of the instructions, and the generated data. Finally, the chip is authenticated by the generated first information and the generated second information.

The software and hardware simulation environment are initialized via the file, so that a large amount of random instructions and data tests can be conveniently performed. By performing the same instructions with the software simulator and the hardware simulator respectively and comparing the results, it may timely find out the position of the functional error of the simulator and then correct the error, therefore it ensures the correctness of the functions of the functional simulator. The functional integrity of the simulator may be ensured by testing of a large number of random instructions and continuous testing in the authentication environment, covering all instruction combinations.

The basic principles and several exemplary implementations of the present disclosure are described below with reference to the accompanying drawings.

FIG. 1 illustrates a schematic diagram of an exemplary environment 100 in which various embodiments of the present disclosure may be implemented. It is to be understood that the environment 100 illustrated in FIG. 1 is merely exemplary and should not constitute any limitation on the functionality and scope of the implementations described in this disclosure. As shown in FIG. 1, the environment 100 includes a configuration file 110, an instruction 120-1, an instruction 120-2 (hereinafter referred to collectively as a plurality of instructions 120), data 130, a computing device 140, a software environment 150, a hardware environment 160, first information 170, second information 180, and an authentication result 190.

The configuration file 110 may include a plurality of instructions 120, although only two instructions 120-1, 120-2 are shown in FIG. 1, this is merely exemplary and there may be more instructions and instruction sets. The plurality of instructions 120 may be of the same type or may be of different types, including, but not limited to, data transmission instructions, arithmetic operation instructions, bit operation instructions, program procedural control instructions, string operation instructions, processor control instructions, and the like. The configuration file 110 may also include data 130, which may be data required for executing the above-described instructions, or other data irrespective of the above-described instructions. Types of data include, but not limited to, linear tables, stacks and queues, arrays, trees, graphs, generalized tables, sparse matrices, and the like. The configuration file 110 may randomly generate a large amount of data and instructions for subsequent operations. The instructions and data may be of the binary, octal, decimal, or hexadecimal type, and the present disclosure is not limited herein.

The computing device 140 may create the software environment 150 and the hardware environment 160 based on the characteristics of the chip, such as structure, function, logic, etc. The software environment 150 may be a functional simulator that verifies the functionality of the chip, and may be created through the C, C++ languages. The hardware environment 160 may be a hardware RTL (Register Transfer Level) system for describing an abstract level of circuit operation, created by a hardware description language (e.g., Verilog, system Verilog, VHDL), or the like. In one example, the computing device 140 performs simulation of the functionality of the chip through the software environment 150 and the hardware environment 160 via instructions, data, register, and memory.

The computing device 140 may configure the software environment 150 and the hardware environment 160 via a plurality of instructions 120 or data 130 in the configuration file 110, for example, memory and register of the hardware environment 160 and the software environment 150 may be initialized by the configuration file 110. The computing device 140 may run instructions and data through the configured software environment 150 and the hardware environment 160 to generate the first information 170 and the second information 180, respectively. The first information 170 and the second information 180 may be instructions and PC values of instructions, generated data, details of instructions, such as instruction meaning, functions, source operands, results, etc.

Although the computing device 140 is shown as including the software environment 150 and the hardware environment 160, the computing device 140 may also be an entity other than the software environment 150 and the hardware environment 160. The computing device 140 may be any computing-capable device. By way of a non-limiting example, the computing device 140 may be any type of fixed computing device, mobile computing device, or portable computing device, including, but not limited to, a desktop computer, a laptop computer, a notebook computer, a tablet computer, a multimedia computer, a mobile phone, and the like; All or a portion of the components of the computing device 140 may be distributed over the cloud. The computing device 140 includes at least a processor, a memory, and other components typically present in a general purpose computer to perform functions like computing, storage, communication, control, and the like.

The computing device 140 may also generate the authentication result 190 by comparing the first information 170 and the second information 180, and then determine the location of the error in the software environment 150 and the hardware environment 160 by the authentication result and make improvements.

Figure 2:
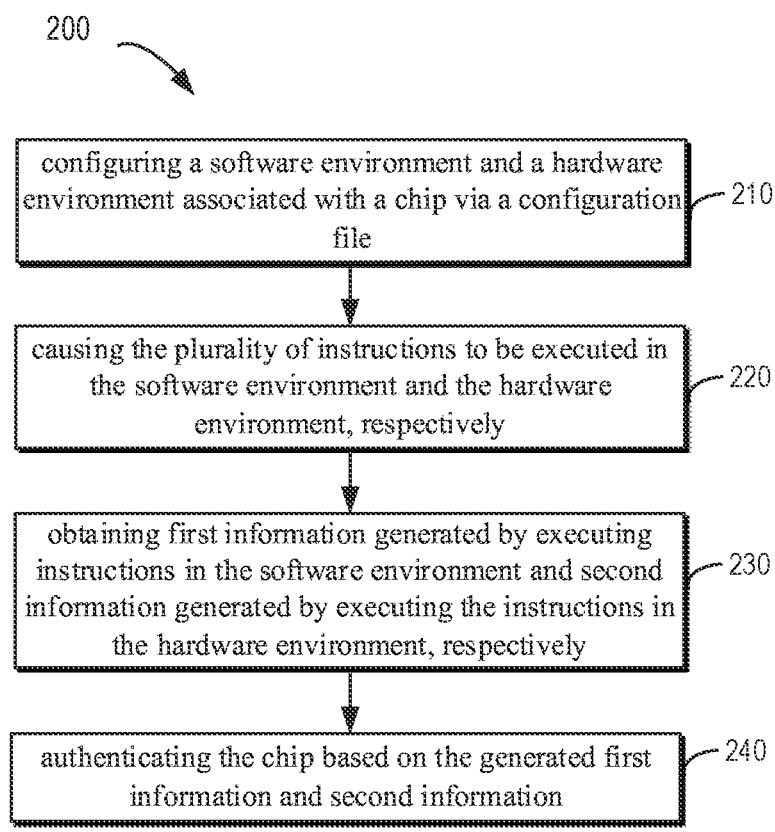
FIG. 2 illustrates a flow chart of a process for authenticating a chip according to some embodiments of the present disclosure.

The detailed authentication process is further described below in connection with FIGS. 2 to 5. FIG. 2 illustrates a flowchart of a method 200 of authenticating the chip according to an embodiment of the present disclosure. The method 200 may be implemented by the computing device 140 in FIG. 1. For ease of description, the method 200 will be described with reference to FIG. 1.

At block 210, the computing device 140 configures the software environment 150 and the hardware environment 160 associated with the chip via the configuration file 110, where the configuration file 140 includes a plurality of instructions 120 and data 130 required to execute the plurality of instructions, the software environment 150 and the hardware environment 160 being created based on the chip. For example, the computing device 140 may generate a large number of random instructions and data via the configuration file 110 to configure the software environment 150 and the hardware environment 160 for testing the software environment 150 and the hardware environment 160. The computing device 140 creates the software environment 150 and the hardware environment 160 for testing the chip through different programming languages, based on the function, logic, and specific circuit structure of the chip to be created.

In one embodiment, for constructing the hardware environment 160, the computing device 140 divides the chip system into a number of basic units according to the design methodology from the top layer functions and structures of the chip, and then divides each basic unit into basic units of the next level, and so on, until gates or connection lines can be used directly to construct the hardware environment 160 gradually, step by step. The hardware environment may be a hardware RTL system, and in one example, the computing device 140 may construct a hardware RTL system by performing functional definitions and module-partitioning, defining interfaces for all modules, designing a clock domain, considering critical path of a design, top layer design, FSM design, timing logic design, combinational logic design.

By initializing via the file, it is convenient to perform a large number of random instructions and data tests, so that the instruction coverage of subsequent tests may be improved, and the functional completeness of the chip to be authenticated and the simulator of the chip may be ensured.

In one embodiment, the computing device 140 may ensure that the instructions and data generated each time by the configuration file is different by time seeds, i.e., that the generated instructions and data corresponding thereto are different by ensuring that the time seeds obtained each time are different.

In one embodiment, the software environment 150 and the hardware environment 160 use an instruction memory which may be a plurality of instruction memories, a register which may be a plurality of registers or a register group, and a data memory which may be a plurality of data memories. Taking the software environment 150 as an example, the computing device 140 may configure the software environment 150 by the following steps (1), (2), (3):

(1) The computing device 140 stores a plurality of instructions 120 randomly generated by the configuration file 110 in an instruction memory, where each row represents an instruction to be executed, and the plurality of instructions are sorted in an order of ascending PC value,

02003000

. . .

7ff1111b (2) The computing device 140 stores register data of a plurality of data randomly generated by the configuration file 110 in registers, each row representing data stored in one register, in ascending order of register number, F323bad1

. . .

23dc0ab8

(3) The computing device 140 stores memory data of a plurality of data randomly generated by the configuration file 110 in a memory, each row representing data stored in the memory, in ascending order of memory address, 1030f0bc

. . .

049a0dc1

Although in this example, the above data is described in hexadecimal, this does not intend to limit the present disclosure, and other bases data may be used. The process of configuring the hardware environment 160 is similar to that described above, and details are not described herein.

At block 220, the computing device 140 causes the plurality of instructions 120 to be executed in the software environment and the hardware environment, respectively. For example, the computing device may authenticate an environment based on hardware code and meanwhile execute the instructions 120 configured in the above via the software environment 150 (e.g., a function simulator) and the hardware environment 160 (e.g., a hardware RTL system).

At block 230, the computing device 140 obtains the first information 170 generated by executing the plurality of instructions 120 in the software environment 150 and the second information 180 generated by executing the plurality of instructions 120 in the hardware environment 160, respectively, the first information 170 and second information 180 including the plurality of instructions being executed, the addresses of the instructions, and the data generated by executing the instructions.

In one embodiment, taking the first information 170 generated by the software environment 150 and the computing device 140 as an example, the above steps (1), (2), and (3) are continued. After the computing device 140 stores a plurality of instructions in the instruction memory, the instructions stored in the step (1) are acquired from the instruction memory in the PC value order, then the instructions are decoded, and register data (e.g., source operands) stored in the step (2) are acquired from the register. The computing device 140 then performs instruction-related calculations, where based on the complexity of the instructions, the memory data stored in step (3) may be read from the data memory during instruction execution and the data generated during the execution of the instructions can be written to the data memory. Finally, the computing device 140 writes the final execution result of the instructions into the register and continues to repeat the above process until all instructions for testing are executed. The computing device 140 obtains the instructions being executed therein, their addresses and the generated data as the first information 170.

In one example, the software environment 150 is configured by the following steps (4), (5), (6):

(4) The computing device 140 obtains, as the first information 170, PC values and instructions during execution, each line representing a PC value and a corresponding instruction, sorted in an order of instruction execution,

00000000: 02003000

. . .

000007fc: 7ff1111b (5) After completing the execution of the instructions, the computing device 140 obtains the result data of the registers in the software environment 150 as the first information 170, and each row represents data of a register, in ascending order of register number, 4f3eba17

. . .

19efdc80

(6) After completing the execution of the instructions, the computing device 140 obtains the result data of the data memory in the software environment 150 as the first information 170, and each row represents one result data of the data memory, in ascending order of the memory address, 429a13fc

. . .

B92a8d12

The process by which the computing device 140 obtains the second information 180 in the hardware environment 160 is similar to that described above, and details are not described herein.

Figure 3:
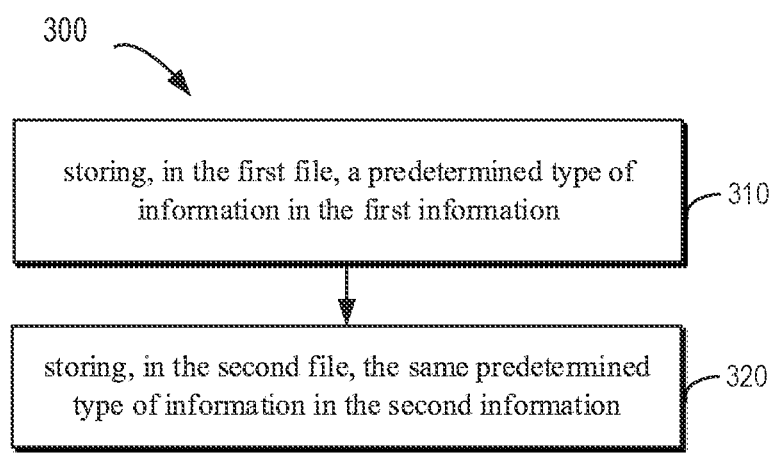
FIG. 3 illustrates a flow chart of a process for storing information according to some embodiments of the present disclosure.

In one embodiment, the computing device 140 stores the acquired information, which will be described with reference to FIG. 3. FIG. 3 illustrates a flow diagram of a process for storing information according to some embodiments of the present disclosure.

At block 310, the computing device 140 stores in the first file a predetermined type of information in the first information 170, the predetermined type including one of an instruction type, a memory data type, and a register data type. For example, the computing device 140 stores the data of the instruction type in the first information 170 obtained in the above step (4) (that is, the executed instruction, its PC value, and the execution order thereof) in the A file of the first file, stores the data of the register data type in the first information 170 obtained in the above step (5) in the B file of the first file, and stores the data of the memory data type in the first information 170 obtained in the above step (6) in the C file of the first file.

At block 320, the computing device 140 stores, in the second file, the same the predetermined type of information in the second information 180. For example, the computing device 140 stores the data of the instruction type in the second information 180 in the A' file of the second file, stores the data of the register data type in the second information 180 in the B' file of the second file, and stores the data of the memory data type in the second information 180 in the C' file of the second file.

By storing the instruction execution result data in the files, it facilitates subsequent automatic comparison to authenticate whether the result is correct.

At block 240, the computing device 140 authenticates the chip based on the generated first information 170 and the second information 180. This will be further described in connection with FIGS. 4 and 5.

Figure 4:
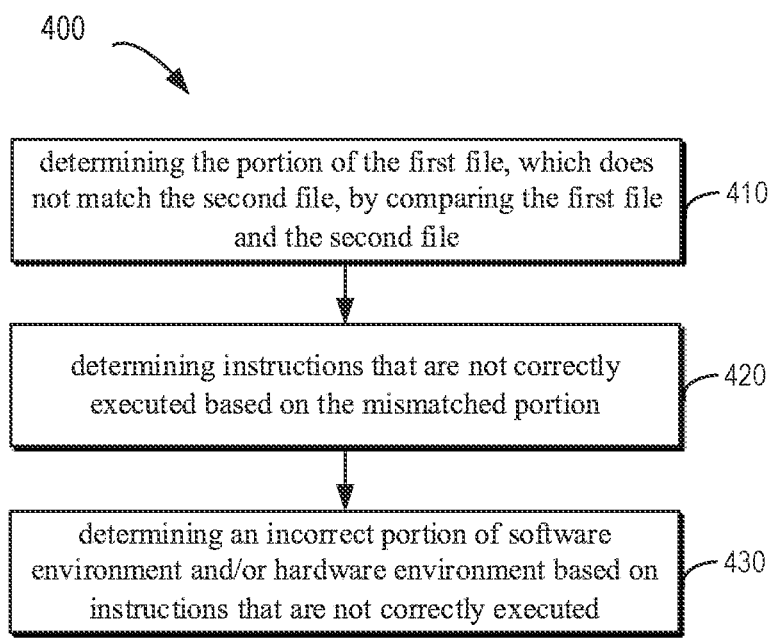
FIG. 4 illustrates a flow chart of a process for authenticating a chip according to some embodiments of the present disclosure.

Turning to FIG. 4, a flow chart of a process for authenticating a chip according to some embodiments of the present disclosure is shown. At block 410, the computing device 140 determines the portion of the first file, which does not match the second file, by comparing the first file and the second file. In one example, the computing device 140 compares the same type of data in the first file and the second file, respectively. For example, the computing device 140 compares the instruction in the A file in the first file with the instruction in the A' file in the second file on a line-by-line basis, compares the data in the B file in the first file with the data in the B' file in the second file on a line-by-line basis, and compares the data in the C file in the first file with the data in the C' file in the second file on a line-by-line basis, so as to determine the portion in which the data are inconsistent.

At block 420, the computing device 140 determines instructions that are not correctly executed based on the mismatched portion. In one embodiment, the computing device 140 determines that a line of instructions in the A file is inconsistent with a line of instructions in the A' file, and then directly determine that this instruction is not properly executed.

In another embodiment, the computing device 140 determines that a row of data in the B or C file is inconsistent with a row of data in the B' or C' file, from which the computing device may find an instruction associated with the data to determine the instruction which is not properly executed.

At block 430, the computing device 140 determines an incorrect portion of software environment 150 and/or hardware environment 160 based on instructions that are not correctly executed. For example, the computing device may determine a functional error in the software environment 150 and/or the hardware environment 160 based on the incorrectly executed instructions, thereby improving the functional simulator or the hardware RTL system. Further description will be made in connection with FIG. 5.

Figure 5:
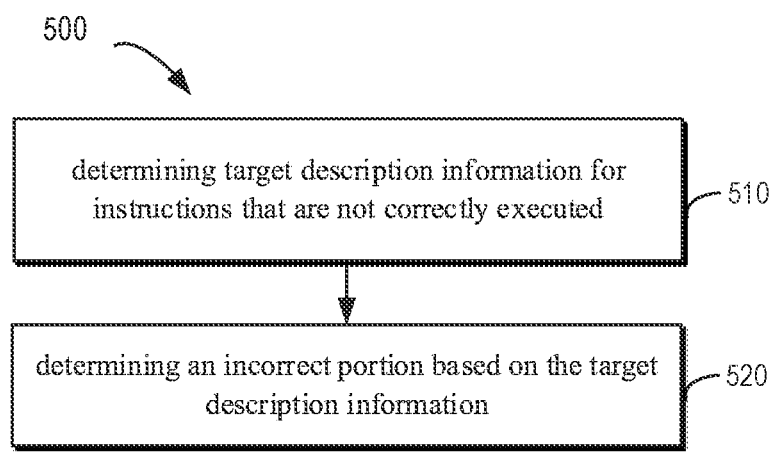
FIG. 5 illustrates a flow chart of a process for authenticating a chip according to some embodiments of the present disclosure.

Turning to FIG. 5, a flow chart of a process for authenticating a chip according to some embodiments of the present disclosure is shown.

At block 510, the computing device 140 determines target description information for instructions that are not correctly executed. For example, when performing the above steps (1) to (6) with respect to the software environment 150, the computing device 140 may acquire the target description information of all the executed instructions, and store the acquired information in a third file, through which the target description information of the instructions that are not correctly executed may be determined after determining the instruction which is not executed correctly.

In one embodiment, the description information includes at least one of a meaning of the instruction, a function, a source operand, or an execution result.

At block 520, the computing device 140 determines an incorrect portion based on the target description information. For example, based on the meaning, function, source operand, and execution result of the incorrectly executed instruction, the computing device 140 may more easily determine the function and location of the error in the software environment 150 and/or the hardware environment 160.

In an alternative embodiment, the computing device may also authenticate the chip by comparing the processes of running the software environment 150 and/or the hardware environment 160 and the result of processes, respectively, with a threshold rather than performing the comparison therebetween.

The present disclosure initializes a software and hardware simulation environment through the file, facilitates testing a large number of random instructions and data, and facilitates the automatic comparison to authenticate whether the results are correct by storing the running result data in the file. By performing the same instructions utilizing the software simulator and the hardware simulator respectively and comparing the results, the position of the functional error of the simulator may be timely found, modified and improved, thereby the correctness of the function of the functional simulator may be ensured. The functional integrity of the simulator may be ensured by testing the large number of random instructions and continuously testing the authentication environment, covering all instruction combinations.

Figure 6:
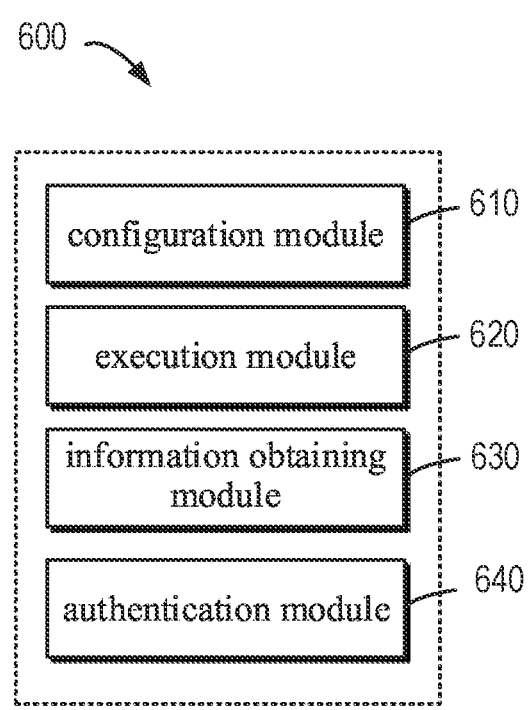
FIG. 6 shows a schematic block diagram of an apparatus for authenticating a chip according to some embodiments of the present disclosure.

FIG. 6 shows a schematic block diagram of an apparatus 600 for authenticating the chip according to some embodiments of the present disclosure. The apparatus 600 may be included in or implemented as the computing device 140 of FIG. 1.

As shown in FIG. 6, an apparatus 600 includes a configuration module 610 configured to configure a software environment and a hardware environment associated with the chip via a configuration file, where the configuration file includes a plurality of instructions and data required to execute the plurality of instructions, the software environment and the hardware environment are created based on the chip; an execution module 620 configured to cause a plurality of instructions to be executed in a software environment and a hardware environment, respectively; an information obtaining module 630 configured to obtain first information generated by executing instructions in a software environment and second information generated by executing instructions in a hardware environment, respectively. The first information and the second information include the instructions being executed, an address of the instructions, and data generated by executing the instructions. The apparatus 600 may further includes an authentication module 640 configured to authenticate the chip based on the generated first information and the generated second information.

In some embodiments, the software environment and the hardware environment use an instruction memory, a register, and a data memory. The configuration module 610 may include an instruction storage module configured to store a plurality of instructions of the configuration file in the instruction memory; and a data storage module is configured to store a plurality of data required for executing the plurality of instructions in the register and the data memory.

In some embodiments, the generated data includes register data and memory data. The apparatus 600 may further include a first information storage module configured to store a predetermined type of information in the first information in the first file, the predetermined type including one of an instruction type, a memory data type, and a register data type; and a second information storage module configured to store the same predetermined type of information in the second information in the second file.

In some embodiments, the authentication module 640 may include a comparison module configured to determine a portion of the first file, which does not match the second file, by comparing the first file and the second file; a first error determination module configured to determine an instruction that is not correctly executed based on the mismatched portion; and a second error determination module configured to determine an incorrect portion of the software environment and/or the hardware environment based on instructions that are not correctly executed.

In some embodiments, the first information further includes description information of the plurality of instructions that are executed, where the second error determination module may include a target description information determination module configured to determine target description information of the instructions that are not correctly executed; and a third error determination module configured to determine an incorrect portion based on the target description information.

In some embodiments, the description information of the plurality of instructions that are executed includes at least one of a meaning of the instruction, a function, a source operand, or an execution result.

Figure 7:
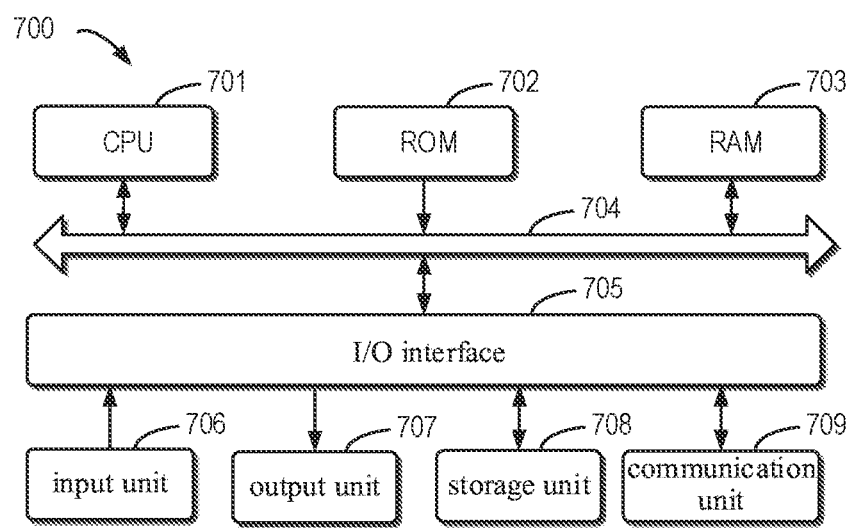
FIG. 7 illustrates a block diagram of a computing device capable of implementing various embodiments of the present disclosure.

FIG. 7 illustrates a schematic block diagram of an example device 700 that may be used to implement embodiments of the present disclosure. For example, the computing device 140 in the example environment 100 shown in FIG. 1 may be implemented by a device 700. As shown, the apparatus 700 includes a Central Processing Unit (CPU) 701, which may perform various appropriate actions and processes according to computer program instructions stored in a Read Only Memory (ROM) 702 or computer program instructions loaded into a Random Access Memory (RAM) 703 from a storage unit 708. In RAM 703, various programs and data required for operation of the device 700 may also be stored. CPU 701, ROM 702, and RAM 703 are connected to each other via a bus 704. An Input/Output (I/O) interface 705 is also connected to bus 704.

A plurality of components in the device 700 are connected to the I/O interface 705, including an input unit 706, such as a keyboard, a mouse, and the like; An output unit 707, for example, various types of displays, speakers, and the like; A storage unit 708, such as a magnetic disk, an optical disk, or the like; And a communication unit 709, such as a network card, a modem, or a wireless communication transceiver. The communication unit 709 allows the device 700 to exchange information/data with other devices over a computer network such as the Internet and/or various telecommunications networks.

The various procedures and processes described above, such as methods 200, 300, 400, and 500, may be performed by processing unit 701. For example, in some embodiments, methods 200, 300, 400, and 500 may be implemented as a computer software program tangibly embodied in a machine-readable medium, such as storage unit 708. In some embodiments, some or all of the computer program may be loaded and/or installed on the device 700 via the ROM 702 and/or the communication unit 709. When the computer program is loaded into the RAM 703 and executed by the CPU 701, one or more actions of the methods 200, 300, 400, and 500 described above may be performed.

The present disclosure may be a method, apparatus, system, and/or computer program product. The computer program product may include a computer readable storage medium having computer readable program instructions embodied thereon for performing various aspects of the present disclosure.

The computer-readable storage medium may be a tangible device that may hold and store instructions for use by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive lists) of the computer-readable storage medium include a portable computer disk, a hard disk, a Random Access Memory (RAM), a Read Only Memory (ROM), an Erasable Programmable Read Only Memory (EPROM or flash memory), a Static Random Access Memory (SRAM), a portable Compact Disk Read Only Memory (CD-ROM), a Digital Versatile Disk (DVD), a memory stick, a floppy disk, a mechanical encoding device, such as a punch card or in-groove bump structure on which instructions are stored, and any suitable combination of the foregoing. As used herein, a computer-readable storage medium is not to be construed as an instantaneous signal itself, such as a radio wave or other freely propagating electromagnetic wave, an electromagnetic wave propagating through a waveguide or other transmission medium (e.g., an optical pulse through a fiber optic cable), or an electrical signal transmitted through a wire.

The computer readable program instructions described herein may be downloaded from a computer readable storage medium to various computing/processing devices, or via a network, such as the Internet, a local area network, a wide area network, and/or a wireless network, to an external computer or external storage device. The network may include copper transmission cables, fiber optic transmission, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium in the respective computing/processing device.

The computer program instructions used to perform the operations of the present disclosure may be assembly instructions, Instruction Set Architecture (ISA) instructions, machine instructions, machine-related instructions, microcode, firmware instructions, state setting data, or source or object code written in any combination of one or more programming languages, including object-oriented programming languages such as Smalltalk, C++, and the like, and conventional procedural programming languages such as "C" language or similar coding language; the computer readable program instructions may be executed entirely on the user computer, partly on the user computer, as a separate software package, partly on the user computer and partly on the remote computer, or entirely on the remote computer or server. In the case of a remote computer, the remote computer may be connected to the user computer through any kind of network, including a Local Area Network (LAN) or a Wide Area Network (WAN), or may be connected to an external computer (e.g., connected through the Internet using an Internet service provider). In some embodiments, various aspects of the present disclosure are implemented by personalizing electronic circuits, such as programmable logic circuits, Field Programmable Gate Arrays (FPGA), or Programmable Logic Arrays (PLAs), with the status information of the computer-readable program instructions.

Various aspects of the present disclosure are described herein with reference to flow charts and/or block diagrams of method, apparatus (system), and computer program product in accordance with embodiments of the present disclosure. It should be understood that each block of the flowcharts and/or block diagrams, and combinations of blocks in the flowcharts and/or block diagrams, may be implemented by computer readable program instructions.

The computer readable program instructions may be provided to a processing unit of a general purpose computer, special purpose computer, or other programmable data processing apparatus to produce a machine such that the instructions, when executed by the processing unit of the computer or other programmable data processing apparatus, produce means for implementing the function/act specified in one or more blocks of the flowchart and/or block diagram. The computer-readable program instructions may also be stored in a computer-readable storage medium that cause a computer, programmable data processing apparatus, and/or other device to operate in a particular manner, such that the computer-readable medium having the instructions stored thereon includes an article of manufacture that includes instructions that implement various aspects of the functions/acts specified in one or more blocks of the flowchart and/or block diagram.

Computer readable program instructions may also be loaded onto a computer, other programmable data processing apparatus, or other device such that a series of operational steps are performed on the computer, other programmable data processing apparatus, or other device to produce a computer-implemented process such that the instructions that execute on the computer, other programmable data processing apparatus, or other device implement the functions/acts specified in one or more blocks of the flowcharts and/or block diagrams.

The flowcharts and block diagrams in the drawings illustrate architectures, functions, and operations of possible implementations of systems, methods, and computer program products in accordance with various embodiments of the present disclosure. In this regard, each block in a flowchart or block diagram may represent a module, program segment, or portion of an instruction that contains one or more executable instructions for implementing a specified logical function. In some alternative implementations, the functions noted in the blocks may also occur in an order different from that noted in the drawings. For example, two successive blocks may actually be executed substantially in parallel, and they may sometimes be executed in the reverse order, depending on the functionality involved. It is also noted that each block of the block diagrams and/or flowcharts, and combinations of blocks in the block diagrams and/or flowcharts, may be implemented with a dedicated hardware-based system that performs the specified functions or actions, or may be implemented with a combination of dedicated hardware and computer instructions.

Various embodiments of the present disclosure have been described in the above, the foregoing description is exemplary, not exhaustive, and is not limited to the various embodiments disclosed. Many modifications and variations will be apparent to those of ordinary skilled in the art without departing from the scope and spirit of the illustrated embodiments. The choice of terms used herein is intended to best explain the principles of the various embodiments, their practical application, or improvements to the technology in the marketplace, or to enable others of ordinary skilled in the art to understand the various embodiments disclosed herein.

What is claimed is:

1. A method of authenticating a chip, comprising:
    configuring a software environment and a hardware environment associated with a chip via a configuration file, the configuration file comprising a plurality of instructions and data required to execute the plurality of instructions, the software environment and the hardware environment being created based on the chip;
    causing the plurality of instructions to be executed in the software environment and the hardware environment, respectively;

obtaining a first information generated by executing the plurality of instructions in the software environment and a second information generated by executing the plurality of instructions in the hardware environment, respectively, the first information and the second information comprising the plurality of instructions being executed, an address of the instructions, and data generated by executing the instructions; and authenticating the chip based on the generated first information and second information, wherein the generated data comprises register data and memory data, and the method further comprises:

storing, respectively in different sub-files of a first file, the first information by types, the types comprising a type of instructions, a type of memory data, and a type of register data; and storing, respectively in different sub-files of a second file, the second information by the types, the types comprising the type of instructions, the type of memory data, and the type of register data.

2. The method of claim 1, wherein the software environment and the hardware environment use an instruction memory, a register, and a data memory, and wherein the configuring a software environment and a hardware environment associated with the chip via a configuration file comprises:

storing the plurality of instructions of the configuration file in the instruction memory; and storing the data required to execute the plurality of instructions in the register and the data memory.

3. The method of claim 1, wherein the authenticating the chip based on the generated first information and second information comprises:

determining a portion of the first file, which does not match the second file, by comparing the first file and the second file by the types;

determining an instruction that is not correctly executed based on mismatched portion; and determining an incorrect portion of the software environment and/or the hardware environment based on the incorrectly executed instruction.

4. The method of claim 3, wherein the first information further comprises description information of the plurality of instructions being executed, and wherein determining an incorrect portion of the software environment and/or the hardware environment based on the incorrectly executed instruction comprises:

determining target description information of the incorrectly executed instruction; and determining the incorrect portion based on the target description information.

5. The method of claim 4, wherein the description information of the plurality of instructions being executed comprises at least one of a meaning of the instruction, a function, a source operand, or an execution result.

6. The method of claim 1, wherein the storing, respectively in different sub-files of a first file, the first information by types, the types comprising a type of instructions, a type of memory data, and a type of register data comprises:

storing all instructions in the first information in a first sub-file of the first file;

storing all memory data in the first information in a second sub-file of the first file; and storing all register data in the first information in a third sub-file of the first file; and the storing, respectively in different sub-files of a second file, the second information by the types, the types comprising the type of instructions, the type of memory data, and the type of register data comprise:

storing all instructions in the second information in a fourth sub-file of the second file;

storing all memory data in the second information in a fifth sub-file of the second file; and storing all register data in the second information in a sixth sub-file of the second file.

7. An electronic device, comprising:

one or more processors; and a memory for storing one or more programs which, when executed by the one or more processors, cause the one or more processors to perform operations comprising:

configuring a software environment and a hardware environment associated with a chip via a configuration file, the configuration file comprising a plurality of instructions and data required to execute the plurality of instructions, the software environment and the hardware environment being created based on the chip;

causing the plurality of instructions to be executed in the software environment and the hardware environment, respectively;

obtaining a first information generated by executing the plurality of instructions in the software environment and a second information generated by executing the plurality of instructions in the hardware environment, respectively, the first information and the second information comprising the plurality of instructions being executed, an address of the instructions, and data generated by executing the instructions; and authenticating the chip based on the generated first information and second information, wherein the generated data comprises register data and memory data, and the method further comprises:

storing, respectively in different sub-files of a first file, the first information by types, the types comprising a type of instructions, a type of memory data, and a type of register data; and storing, respectively in different sub-files of a second file, the second information by the types, the types comprising the type of instructions, the type of memory data, and the type of register data.

8. The electronic device of claim 7, wherein the software environment and the hardware environment use an instruction memory, a register, and a data memory, and wherein the configuring a software environment and a hardware environment associated with the chip via a configuration file comprises:

storing the plurality of instructions of the configuration file in the instruction memory; and storing the data required to execute the plurality of instructions in the register and the data memory.

9. The electronic device of claim 7, wherein the authenticating the chip based on the generated first information and second information comprises:

determining a portion of the first file, which does not match the second file, by comparing the first file and the second file by the types;

determining an instruction that is not correctly executed based on mismatched portion; and determining an incorrect portion of the software environment and/or the hardware environment based on the incorrectly executed instruction.

10. The electronic device of claim 9, wherein the first information further comprises description information of the plurality of instructions being executed, and wherein determining an incorrect portion of the software environment and/or the hardware environment based on the incorrectly executed instruction comprises:
determining target description information of the incorrectly executed instruction; and
determining the incorrect portion based on the target description information.

11. The electronic device of claim 10, wherein the description information of the plurality of instructions being executed comprises at least one of a meaning of the instruction, a function, a source operand, or an execution result.

12. The electronic device of claim 7, wherein the storing, respectively in different sub-files of a first file, the first information by types, the types comprising a type of instructions, a type of memory data, and a type of register data comprises:
storing all instructions in the first information in a first sub-file of the first file;
storing all memory data in the first information in a second sub-file of the first file; and
storing all register data in the first information in a third sub-file of the first file; and
the storing, respectively in different sub-files of a second file, the second information by the types, the types comprising the type of instructions, the type of memory data, and the type of register data comprise:
storing all instructions in the second information in a fourth sub-file of the second file;
storing all memory data in the second information in a fifth sub-file of the second file; and
storing all register data in the second information in a sixth sub-file of the second file.

13. A non-transitory computer readable storage medium storing a computer program which, when executed by a processor, causes the processor to perform operations comprising:
configuring a software environment and a hardware environment associated with a chip via a configuration file, the configuration file comprising a plurality of instructions and data required to execute the plurality of instructions, the software environment and the hardware environment being created based on the chip;
causing the plurality of instructions to be executed in the software environment and the hardware environment, respectively;
obtaining a first information generated by executing the plurality of instructions in the software environment and a second information generated by executing the plurality of instructions in the hardware environment, respectively, the first information and the second information comprising the plurality of instructions being executed, an address of the instructions, and data generated by executing the instructions; and
authenticating the chip based on the generated first information and second information,
wherein the generated data comprises register data and memory data, and the method further comprises:
storing, respectively in different sub-files of a first file, the first information by types, the types comprising a type of instructions, a type of memory data, and a type of register data; and
storing, respectively in different sub-files of a second file, the second information by the types, the types comprising the type of instructions, the type of memory data, and the type of register data.

14. The storage medium of claim 13, wherein the software environment and the hardware environment use an instruction memory, a register, and a data memory, and
wherein the configuring a software environment and a hardware environment associated with the chip via a configuration file comprises:
storing the plurality of instructions of the configuration file in the instruction memory; and
storing the data required to execute the plurality of instructions in the register and the data memory.

15. The storage medium of claim 13, wherein the authenticating the chip based on the generated first information and second information comprises:
determining a portion of the first file, which does not match the second file, by comparing the first file and the second file by the types;
determining an instruction that is not correctly executed based on mismatched portion; and
determining an incorrect portion of the software environment and/or the hardware environment based on the incorrectly executed instruction.

16. The storage medium of claim 15, wherein the first information further comprises description information of the plurality of instructions being executed, and
wherein determining an incorrect portion of the software environment and/or the hardware environment based on the incorrectly executed instruction comprises:
determining target description information of the incorrectly executed instruction; and
determining the incorrect portion based on the target description information.

17. The storage medium of claim 16, wherein the description information of the plurality of instructions being executed comprises at least one of a meaning of the instruction, a function, a source operand, or an execution result.

18. The storage medium of claim 13, wherein the storing, respectively in different sub-files of a first file, the first information by types, the types comprising a type of instructions, a type of memory data, and a type of register data comprises:
storing all instructions in the first information in a first sub-file of the first file;
storing all memory data in the first information in a second sub-file of the first file; and
storing all register data in the first information in a third sub-file of the first file; and
the storing, respectively in different sub-files of a second file, the second information by the types, the types comprising the type of instructions, the type of memory data, and the type of register data comprise:
storing all instructions in the second information in a fourth sub-file of the second file;
storing all memory data in the second information in a fifth sub-file of the second file; and
storing all register data in the second information in a sixth sub-file of the second file.

* * * * *